United States Patent [19]
Abe et al.

[11] Patent Number: 5,222,918
[45] Date of Patent: Jun. 29, 1993

[54] PULLEY OF A BELT DRIVE MECHANISM

[75] Inventors: Yoji Abe, Kiyose; Tadashi Terada, Mitaka, both of Japan

[73] Assignee: TEAC Corporation, Tokyo, Japan

[21] Appl. No.: 792,386

[22] Filed: Nov. 15, 1991

[30] Foreign Application Priority Data

Nov. 22, 1990 [JP] Japan .............................. 2-123140[U]

[51] Int. Cl.⁵ .............................................. F16H 7/00
[52] U.S. Cl. ................................................ 474/166
[58] Field of Search ..................... 474/166, 167, 190

[56] References Cited

U.S. PATENT DOCUMENTS

| | | | |
|---|---|---|---|
| 421,669 | 2/1890 | Case | 474/166 X |
| 3,851,535 | 12/1974 | Presentey | 474/166 X |
| 4,607,808 | 8/1986 | Collins | 474/166 X |

FOREIGN PATENT DOCUMENTS 83269 3/1991 Japan .

Primary Examiner—Thuy M. Bui
Attorney, Agent, or Firm—Michael N. Meller

[57] ABSTRACT

This invention is regarded to a pulley of a belt drive mechanism. The belt drive mechanism is applied to, for example, magnetic disk apparatuses. The contact surface of the pulley, in contact with a belt of the belt drive mechanism, has a shape of a part of a surface of a sphere.

A center of a sphere is at a point substantially the same as a point of intersection of a plane including a center line of an operating course of the belt and a center line of rotation of the pulley.

4 Claims, 4 Drawing Sheets

PULLEY OF A BELT DRIVE MECHANISM

BACKGROUND OF THE INVENTION

The present invention relates to a pulley that can be used with belt drive mechanisms.

The following two methods are used for disk rotation mechanisms of magnetic disk apparatuses that have conventional flexible magnetic disks mounted on them. One of these methods is the direct drive method where the turntable upon which the disk is mounted is directly driven by the drive motor. The other method is the belt drive method where a rotational drive force of the motor is transmitted to the turntable via a belt that is wound around the pulley fixed monolithically to the turntable.

The mechanism that transmits the rotational force to the turntable in the case of the belt drive method is configured of a drive side pulley that is fixed to an output shaft of the drive motor by pressing the pulley onto it, a driven side pulley fixed monolithically to the turntable, and a belt that is wound around both pulleys. Also, because a head carriage is provided between the turntable and the drive motor, a bending pulley provided between the turntable and the drive motor bends the belt so that it avoids the head carriage.

The pulley that is used in a conventional belt drive mechanism is formed into a cylindrical shape such as a pulley 1 shown in FIG. 1, and has a section of a contact surface 1a taken along a center line of rotation, the surface being in direct contact with the belt. This section has a shape of straight line. A band-shaped belt 2 is wound on the contact surface 1a of the pulley.

In a pulley 3 that is used in another type of conventional belt drive mechanism, a V-shaped groove 3a is provided on an outer surface of the pulley 3 as shown in FIG. 2, and an angled belt 4, a section of which as seen across the operating course has a square shape, is wound around the V-shaped groove 3a.

The pulleys 1 and 3 described above and used in conventional belt drive mechanisms are respectively supported so as to be freely rotatable, by a shaft 5 inserted into central holes of the pulleys. Conventionally, the shaft 5 is assembled so as to be perpendicular to a flat surface of a chassis of an apparatus main unit to which the belt drive mechanism is attached. However, an error in manufacturing accuracy or assembling accuracy of the chassis can cause the shaft 5 to be mounted at an angle to a perpendicular line.

In cases such as these, each of the pulleys 1,3 rotates in an inclined state but the contact surfaces of the pulleys 1,3 touched by belts 2, 4 (hereinafter termed simply "the contact surfaces") do not have a plane symmetrical shapes with respect to planes including a center lines of operating courses of the belts and thus the contact surfaces of the pulleys 1,3 cause the belts 2,4 to move in the direction of thrust. Because of this, the belts 2,4 transmit the rotation drive force to the driven side of the pulley while they move up and down in the direction of this thrust. Accordingly, in the pulleys that are used in the conventional belt drive mechanism, the inclination and rotation of the pulleys 1,3 in an inclined state causes the belts 2,4 to move up and down in the direction of the shaft so that there is a problem where the ration of the turntable, which is a driven portion, becomes unstable.

In addition, such unstable rotation of the turntable causes a problem of deterioration in the recording and reproduction performance of the magnetic disc apparatus which uses the rotation mechanism.

SUMMARY OF THE INVENTION

With respect to this problem, one object of the present invention is to provide a pulley that can be used with belt drive mechanisms and that allows the belt to run stably and rotate the driven portion stably without the contact surface of the pulley causing the belt to move up and down in the direction of thrust even when the shaft, on which the pulley is supported so as to be freely rotatable, is inclined from a vertical line of the chassis of the apparatus in which the belt drive mechanism is used.

Another object of the present invention is to provide a pulley that has a contact surface, a section of which surface taken along a center line of rotation, has an approximately plane symmetrical shape with respect to a plane including a center line of an operating course of a belt and that is, in the running direction of that belt.

Yet another object of the present invention is to apply the pulley to a belt drive mechanism of a disk apparatus that rotationally drives a turntable to which a disk serving as a recording medium for the storage of data is fixed, so as to stably rotate a turntable, which is the driven portion, so that there is no deterioration in the recording and reproduction performance with respect to the disk of the disk apparatus.

In order to achieve the objects described above, a pulley used in a belt drive mechanism is constructed so as to be supported in a freely rotatable manner and has a contact surface in contact with a belt, this contact surface having a shape of a part of a spherical shape having a center at a point substantially the same as a point of an intersection of a plane including a center line of an operating course of the belt and a center line of the rotation. Furthermore, a pulley used in the belt drive mechanism having the construction described above is used in a disk apparatus.

In the present invention, even if the center line of rotation is inclined from a vertical line of the chassis of an apparatus, a pulley has the contact surface, a section of which surface taken along the center line of rotation has an approximately plane symmetrical shape with respect to a shape including a center line of an operating course of the belt, so it is difficult for the belt to move up and down in the direction of thrust, and thus the driven portion can be stably rotated. Furthermore, the pulley of the present invention used in the belt drive mechanism, and the mechanism is used in the disk apparatus so that the turntable is stably rotated, thus eliminating deterioration of the recording and reproduction performance of the disk apparatus.

Other objects and features of the present invention will become clear from the following detailed description of the present invention, with reference to the appended drawings.

DESCRIPTION OF THE PREFERRED EMBODIMENT

Figure 1:
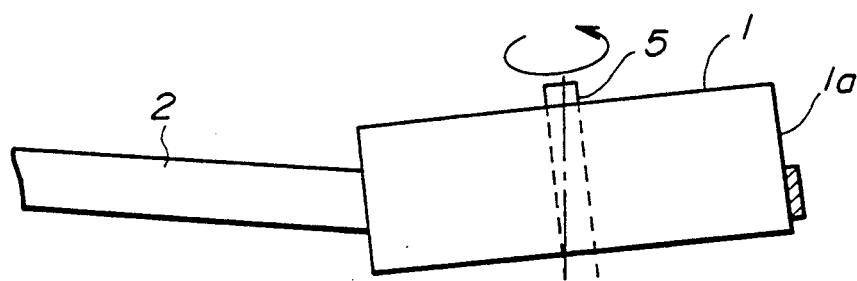
FIG. 1 and FIG. 2 are lateral sectional views of respective conventional pulleys used in a belt drive mechanism.
Figure 2:
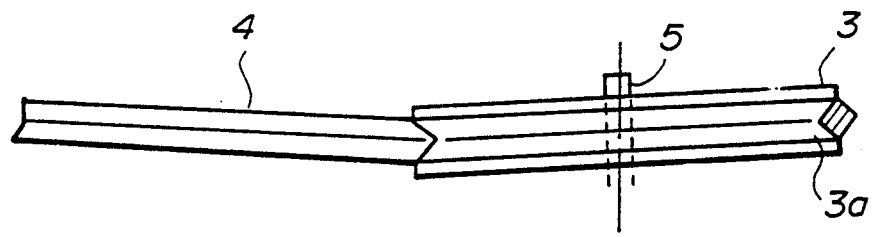
Figure 3:
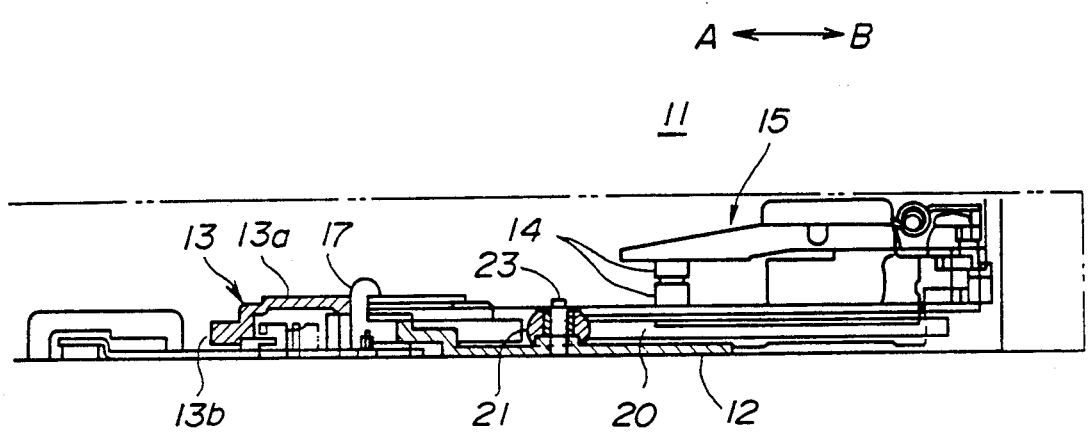
FIG. 3 is a longitudinal sectional view of a magnetic disk apparatus having a belt drive mechanism to which an embodiment of the pulley of the present invention is applied.

FIG. 3 through FIG. 6 are views of an embodiment of a pulley of the present invention applied to a belt drive mechanism.

In these figures, a magnetic disk apparatus 11 uses the belt drive method described above as the method for driving a turntable upon which a disk is mounted. Provided inside the magnetic disk apparatus 11 are a chassis 12, upon which a driven side turntable 13 is mounted and upon which turntable a flexible disk (not indicated in the figures) is mounted, a head carriage 15 that has a magnetic head 14 attacked thereto, and a belt rotation mechanism 16 that rotationally drives the turntable 13.

The turntable 13 is supported so as to be freely rotatable by a shaft 17 that is fixed vertically to the chassis 12, and an upper surface of the turntable 13 is a disk mounting surface 13a. Also, on a lower portion of the turntable 13 a cylindrical shaped contact surface 13b is provided that is in contact with a belt 20.

The head carriage 15 is provided so as to be freely movable along the radial direction of the disk (A,B direction), and the head carriage 15 is driven so as to move the magnetic head 14 in the tracking direction (i.e. the radial direction) of the disk.

Figure 5:
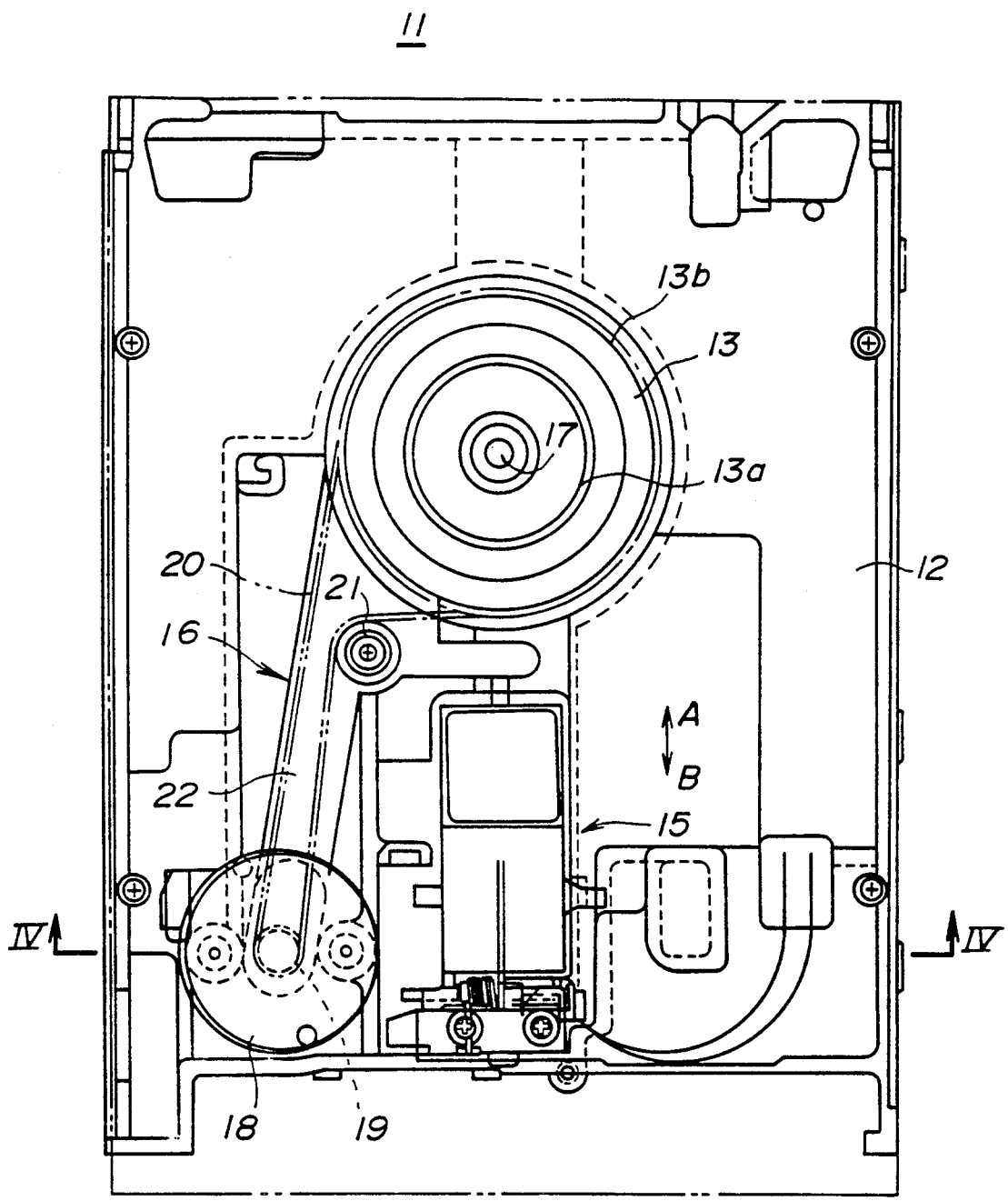
- FIG. 5 is a plan view showing the internal structure of the magnetic disk apparatus of FIG. 3.
Figure 6:
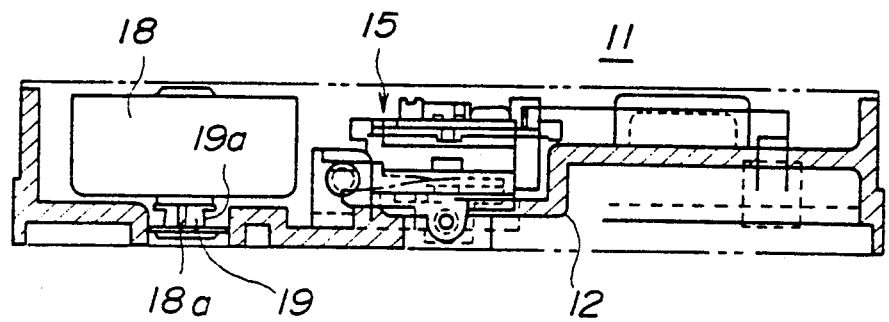
FIG. 6 is a longitudinal sectional view taken along line IV—IV of FIG. 5.

Also, as shown in FIG. 5 and FIG. 6, a turntable drive motor 18 is fixed at a side of the head carriage 15 on the chassis 12. An output shaft 18a of this turntable drive motor 18 protrudes downwardly from the turntable drive motor 18 and a drive side pulley 19 is pressed to be fixed into the output shaft 18a.

The belt 20 is wound around both the contact surface 13b of the turntable 13 that is on the driven side, and a contact surface 19a that is on an external periphery of the drive side pulley 19. Moreover, the contact surface 19a is formed in to a shape which is part of a sphere, and rims protrude in a radial direction from the top and bottom ends of the pulley 19. Between the drive side pulley 19 and the driven side turntable 13 a guide pulley 21 that guides the running course of the belt 20 is provided. This guide pulley 21 bends the running course of the belt 20 into an L-shape so that it moves to the inner side, that is, to the upper left of FIG. 5, so as to avoid the range of movement of the head carriage 15.

Thus, to summarize the above, the belt rotation mechanism 16 is configured of the turntable drive motor 18, the pulley 19, the belt 20 and the guide pulley 21. Moreover, the belt 20 is fitted inside a groove 22 provided on the chassis 12.

Figure 4:
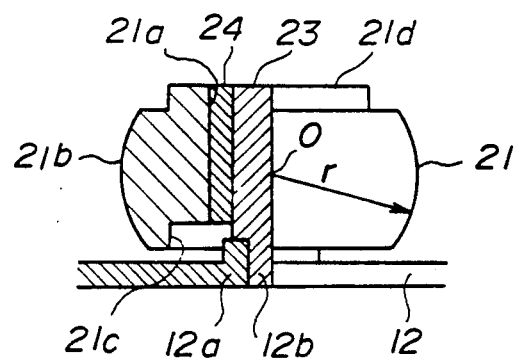
FIG. 4 is a view of an embodiment of a pulley of the present invention, the left half thereof showing a longi

As shown in FIG. 4, the guide pulley 21 is supported so as to be freely rotatable by a shaft 23 fixed vertically in a through hole 12b of a mounting portion 12a of the chassis 12. Also, a cylindrical bearing 24 is pressed to be fixed into a center hole of the guide pulley 21 and the shaft 23 is inserted freely into the bearing 24. Moreover, even if the shaft 23 is only supported by the chassis 12 which is merely a thin plate, the shaft 23 is firmly fixed due to the mounting portion 12a, that fixes the shaft 23, protruding upward from the chassis 12 to become thicker.

The guide pulley 21 has a contact surface 21b which is in contact with the belt 20 and formed so that it is a part of a spherical shape of a radius r, the center of which is at a point O which is in the center of the width between the top and bottom of the contact surface 21b and also on the center line of the shaft 23. In other words, the guide pulley 21 has a shape that is a part of a sphere having a radius r between the two flat surfaces that perpendicularly intersect the shaft 23 and are at equal distances smaller than the radius r in upward and downward directions from the center O of a sphere Also, a bottom portion of the guide pulley 21 is provided with a concave portion 21c so that the bottom portion of the guide pulley 21 does not contact the mounting portion 12a protruding upward from the chassis 12. Because of this, it is possible to have a structure in which the guide pulley 21 is supported at a low position close to the chassis 12. Accordingly, the concave portion 21c of the bottom portion of this guide pulley 21 enables an apparatus which uses the guide pulley 21 to be made thinner.

Furthermore, a stepped portion 21d protrudes upwardly on the top of the guide pulley 21. The guide pulley 21 is stably supported by the shaft 23 even if the width of the contact surface 21b is thin because the length of the bearing 24 in the direction of the shaft 23, that the shaft 23 is engaged in is extended along this stepped portion 21d.

The magnetic disk apparatus 11 having the configuration described above stably rotates the disk (not indicated in the figures) that is mounted on the turntable 13 so that it performs magnetic recording on and reproduction from the disc. In order to stably rotate the disk, the rotational drive force of the motor 18 must be transmitted stably to the turntable 13 via the pulley 19 and the belt 20. Also, if the guide pulley 21 that guides the running course of the belt 20 does not stably rotate because of an error in the manufacturing accuracy or the positioning accuracy of the shaft 23 during the manufacturing stage, then the running course of the belt 20 will move up and down and the rotation of the turntable 13 will consequently become unstable.

Figure 7:
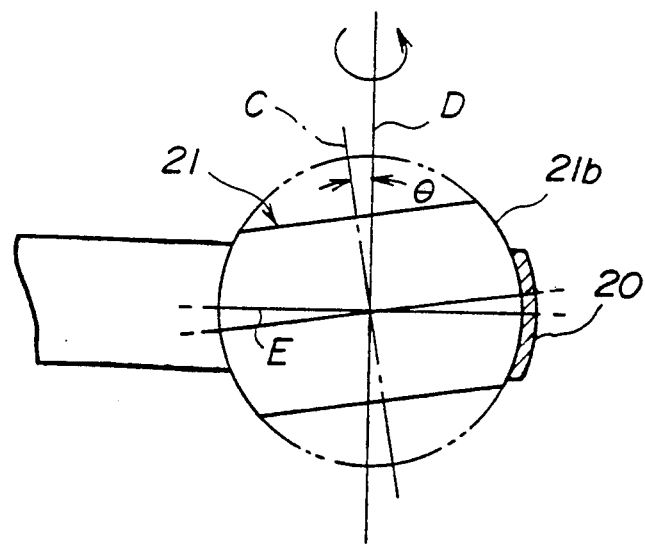
FIG. 7 is a side view showing the state where a center line of rotation of the embodiment of a pulley of the present invention is inclined.

However, the guide pulley 21 has the contact surface 21b in the shape of a part of sphere and so has the state shown in FIG. 7 when, for example, the shaft 23 is fixed at an inclination from a vertical line of the chassis 12. More specifically, an axis C which is the center line of rotation of the guide pulley 21 is in a state where it is inclined at an angle $\theta$ from the vertical line D of the chassis 12, as shown by the chain line in FIG. 7. In this case, even if the guide pulley 21 rotates around the center of the axis C which is inclined, the contact surface 21b has the shape of a part of a surface of a sphere of radius r, a center of which is at an intersection of the vertical line D and the axis C, therefore a part of the contact surface 21b, which the belt 20 is touched by has a plane symmetrical shape- with respect to a plane including the center line E of the operating course of the belt 20, that is, the transverse direction of FIG. 7. Because of this plane symmetrical shape, when the contact surface 21b rotates, it does not move the belt 20 up and down, and therefore the operating course of the belt 20 does not move up and down.

Accordingly, even if the axis C of the guide pulley 21 is inclined due to an error in the assembly accuracy of the shaft 23 or the manufacturing accuracy of the mounting portion 12b into which the shaft 23 that supports the guide pulley 21 is pressed to be fixed, the lack of up and down movement, that is, the change in the operating course of the belt 20 in contact with the contact surface 21b in the direction of thrust, ensures that the belt 20 will stably operate irrespective of the angle of inclination of the guide pulley 21. Therefore, the turntable 13, which is the driven portion, stably rotates.

However, in order for this above operation to be accomplished, it is also necessary to ensure that the width of the contact surface 21b is such that the full width of the inner peripheral surface of the belt 20 can be in contact with the contact surface 21b even when the shaft 23 is inclined. More specifically, if the contact surface 21b does not have sufficient width, then the operation described above cannot be accomplished by a construction where, for example, the lower end of the belt 20 is positioned lower than the lower end of the contact surface 21b due to the inclination of the shaft 23.

The embodiment described above comprises a guide pulley having the contact surface 21b that has the shape of a part of a surface of a sphere but this invention is also applicable to pulleys other than this one. For example, the pulley 19 that is pressed to be fixed into the output shaft 18a of the motor 18 can also have the contact surface that has the shape of a part of a surface of a sphere and that does not have the two rim portions which protrude in a radial direction at the top and bottom thereof.

In addition, the embodiment described above comprises the guide pulley 21 having the contact surface 21b that has the shape of a part of a surface of a sphere, this pulley being applied to a disk apparatus, but the present invention is not limited to the contact surface having the shape of a part of a surface of a sphere, as for example, the pulley can have a contact surface that has a shape of a part of a surface of a sphere with small indentations and protrusions in the surface thereof so as to ensure friction with the belt, or it can have a contact surface that has a curved surface that closely approximates a part of a surface of a sphere.

Furthermore, in the embodiment described above, a pulley was described that is applicable to a magnetic disk apparatus, but the pulley can of course also be applied to apparatuses other disk apparatuses and other apparatuses that require rotational drive.

As has been described above, the pulley used in a belt drive mechanism according to the present invention has a contact surface that makes it difficult for the belt to move up and down even if the line of the pulley axis is inclined.

In addition, even if the line of the pulley axis is inclined, a portion in contact with the belt of the contact surface of the pulley has a shape, a section of which taken along the axis of rotation is approximately plane symmetrical with respect to a plane including the center line of the operating course of the belt.

Therefore, even if the line of the pulley axis is inclined, there is no movement of the belt in up and down directions, the operation of the belt is stable, and the driven portion is stably driven.

More specifically, it is possible to prevent the running course of the belt wound on the pulley from moving up and down even if the pulley is rotated in an inclined state due to some manufacturing error or the like. Because of this, the belt runs stably irrespective of the inclination of the pulley and can stably transmit the rotational drive force of the drive side to the driven side.

Furthermore, the use of this pulley in a belt drive mechanism of a disk apparatus that rotationally drives a turntable to which a disk is fixed as the recording medium for the storage of data, ensures the stable rotation of the turntable and therefore enables the disk apparatus to perform well, that is the recording and reproduction performance is not at all obstructed.

What is claimed is:

1. A pulley of a belt drive mechanism, supported so as to be freely rotatable and comprising a contact surface in contact with a belt, said contact surface being constructed so as to be in contact across the entire width of an inner surface of said belt even when a center line of rotation is inclined at an angel from a line vertical with respect to a plane including a center line of an operating course of said belt on said pulley, and said contact surface having a shape of at least a part of a surface of a sphere, a center of said sphere having a center point the same as a point of said plane that includes a center line of an operating course of said belt on said pulley and said center point is intersected by said center line of rotation.

2. The pulley according to claim 1, wherein said contact surface has a shape of at least a part of a surface of a sphere, said sphere having a center point on said plane including a center line of a width of said belt, said center point being intersected by said center line of rotation, and wherein said contact surface has a shape of said part of a surface of said sphere between two planes that respectively perpendicularly intersect said center point line of rotation at points of said plane that are respectively equidistant from said center point of said sphere, said two planes being located opposite to each other with respect to said center point of said sphere.

3. The pulley according to claim 1, wherein said belt drive mechanism comprises a turntable on which a disk serving as a recording medium for recording of data is to be placed; a motor that supplies a drive force so as to rotationally drive said turntable; and a belt that transmits a drive force of said motor to said turntable, said pulley being supported so as to be freely rotatable and having a contact surface being in contact across the entire width of an inner surface of said belt even when a center line of rotation of said pulley is inclined at an angle from a line vertical with respect to a plane that includes a center line of an operating course of said belt on said pulley, said pulley having a shape of at least a part of a surface of a sphere, a center of which sphere is at a point the same as a point on said plane that includes a center line of an operating course of said belt on said pulley, which point is intersected by said center line of rotation of said pulley.

4. The pulley of claim 3, wherein said pulley is provided in an operating course of said belt between said turntable and motor, and said pulley guides an operating course of said belt.

* * * * *